March 25, 1969     E. S. AUNE ET AL     3,434,406
CAMERA MOUNTING DEVICE
Filed Jan. 14, 1966
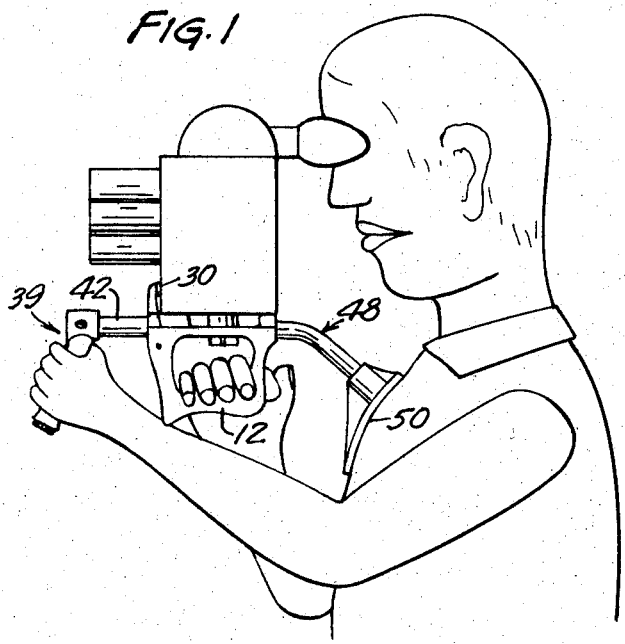
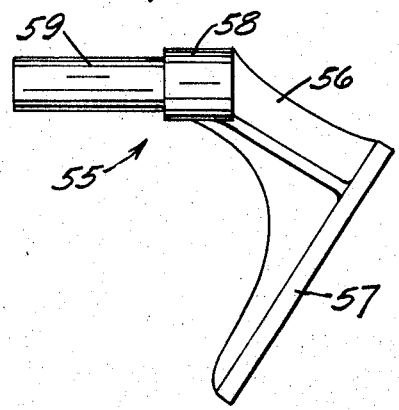
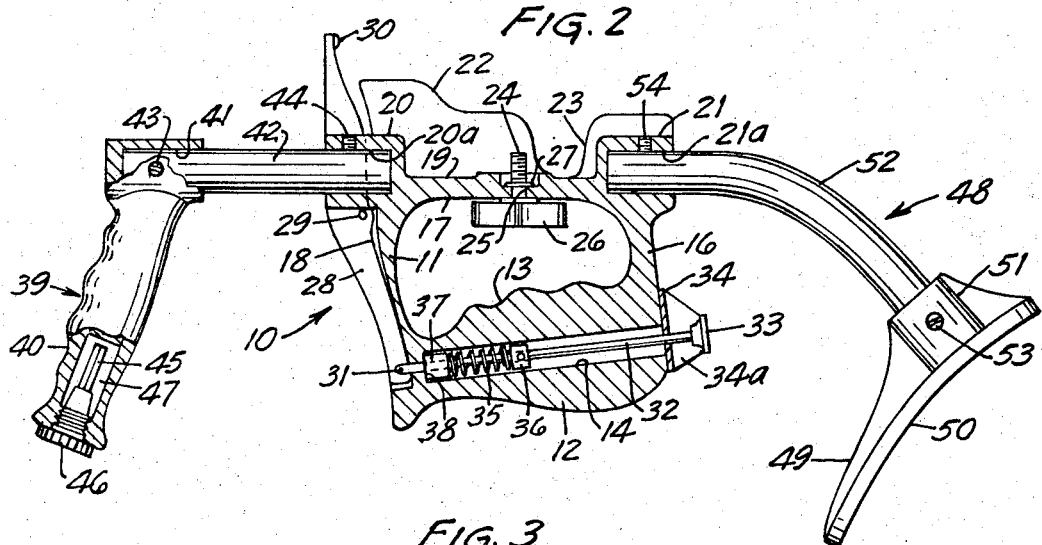
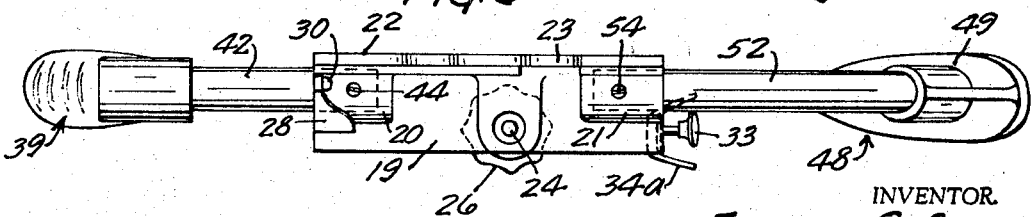
INVENTOR.
EDWARD S. AUNE
LYLE R. BROWN
*Williamson & Palmatier*
ATTORNEYS

United States Patent Office 3,434,406
Patented Mar. 25, 1969

3,434,406
CAMERA MOUNTING DEVICE
Edward S. Aune, 325 W. 102nd St., Bloomington, Minn. 55420, and Lyle Robert Brown, 4928 36th Ave. S., Minneapolis, Minn. 55417
Filed Jan. 14, 1966, Ser. No. 521,489
Int. Cl. G03b 17/56
U.S. Cl. 95—86    6 Claims

ABSTRACT OF THE DISCLOSURE

A camera mounting device comprising a generally rectangular shaped support frame, including a hand grip member to be gripped by the hand of a user and normally horizontally oriented. Front and rear frame members affixed to the hand grip member and projecting upwardly therefrom, and a normally horizontally oriented camera support frame member affixed to the front and rear frame members and spaced above the hand grip member. An actuator element mounted on the frame and being engageable with the shutter mechanism of the camera for actuating the same. And a thumb-engaging operator member connected with the actuator element for shifting the same and projecting rearwardly of the hand grip member whereby a user may support and operate the camera mounted on the support device with one hand.

---

An object of this invention is to provide a novel camera mounting device for releasably mounting a camera thereon and which is arranged and constructed to permit a user to support and operate a camera mounted on the device with one hand.

Another object of this invention is the provision of a novel camera mounting device which not only facilitates carrying and operation of a movie type camera by a user, but which also has a provision for pistol grip attachment as well as a shoulder or chest-engaging attachment to permit the user to very effectively, accurately, and comfortably operate the camera even when the latter is provided with a relatively long telephoto lens.

These and other objects and advantages of the invention will more fully appear from the following description made in connection with the accompanying drawings, wherein like character reference refer to the same or similar parts throughout the several views, and in which:

FIG. 1 is a side elevational view of the camera mounting device illustrating the same in use, FIG. 2 is a side elevational view on an enlarged scale of the camera mounting device with certain parts thereof broken away for clarity, FIG. 3 is a top plan view on the same scale as FIG. 2 of the camera mounting device, and FIG. 4 is a side elevational view of a chest-engaging attachment.

Referring now to the drawings it will be seen that one embodiment of my novel camera mounting device, designated generally by the reference numeral 10, is there shown. This camera mounting device 10 includes a generally rectangular shaped support frame 11 preferably formed of a suitable metallic material and comprising a hand grip frame member 12. It will be noted that the hand grip member 12 has undulated upper surface 13 and has a bore or hollow interior 14 extending therethrough. This hand grip member 12 is dimensioned and contoured to very nicely accommodate the clenched hand of a user to not only facilitate carrying of the support frame 11 with the camera mounted thereon but also facilitates comfortable and accurate aiming of the camera in a manner to be pointed out hereinbelow.

The support frame 11 is normally oriented in use so that the hand grip member 12 extends in a fore and aft direction with respect to the user and it will be seen that a front frame member 15 is integrally formed with one end of the hand grip member 12 and a rear frame member 16 is integrally formed with the rear end of the hand grip member 12. The front and rear frame members 15 and 16 extend upwardly from the hand grip member 12 and a camera support frame member 17 is integrally formed with the respective upper ends of the front and rear frame members and is spaced above and in generally parallel relation with respect to the hand grip member 12. The front frame member 15 has a vertical forwardly opening slot 18 therein which communicates at its lower end with the hollow interior 14 of the hand grip member 12 and ends upwardly through the upper generally flat surface 19 of the camera support frame member 17.

A forwardly facing front socket member 20 is integrally formed with the forward end of the camera support frame member 19 and a rearwardly facing rear socket member 21 is integrally formed with the rear end portion of the camera support frame member 17. The camera support frame member 19 is also provided with a vertically extending stabilizing and positioning wall or element 22 which is integrally formed with the camera support member 17 and extends substantially throughout the length thereof and adjacent one longitudinal side edge thereof. It will be noted that this stabilizing and positioning wall 22 is arranged in substantially right angular relationship with respect to the upper surface 19 of the camera support frame member 17 and is recessed as at 23 intermediate the ends thereof to accommodate certain mechanism of the camera C which is mounted on the support frame 11.

Means are provided for releasably coupling the camera C in mounted relation upon the support frame 11 and this means includes a releasable threaded coupling member 24 which projects through an aperture 25 formed in the camera support frame member 17 intermediate the ends thereof as best seen in FIGS. 2 and 3.

The coupling member 24 is provided with an enlarged head ar actuating knob 26 located closely adjacent the lower surface of the camera support frame member 17 to facilitate threaded engagement of the coupling member with the conventional threaded recess in the camera C. A lock element 27 is disposed embracing relation with the upper end portion of the coupling member 24 and permits the coupling member to be freely revolved with respect to the camera support frame member 17 but prevents accidental removal of the couling member therefrom.

Means are also provided for permitting an operator to actuate the shutter mechanism of the camera C while the same is mounted upon the support frame 11. This means includes an elongate actuator element 28 which is positioned within the recess 18 in the front frame member 15 and is pivotally mounted thereto by pivot 29, which is best seen in FIG. 2, is located intermediate the ends of the actuator element 28. The upper end portion of the actuator element 28 is provided with a generally rearwardly convex shutter engaging element or button 30 which is adapted to engage and actuate the shutter mechanism on the camera when the upper end portion of the actuating lever is moved rearwardly or in a clockwise direction as viewed in FIG. 2. The lower end portion of the actuator element 28 is provided with a pair of attachment elements or ears 31 which receive and are pivotally connected to the apertured front end of an elongate operator member 32, this elongate operator member 32 positioned within the hollow interior 14 of the hand grip member 13 for longitudinal movement relative thereto. It will be seen that the rear end portion of the operator member 32 projects exteriorly of the hand grip member 12 and has a thumb engaging knob 33 secured thereto. A generally U-shaped guard element 34 is secured to the rear end portion of the hand grip member 12 by suitable securing means such as screws and the like. The rearwardly projecting spaced apart parallel legs 34a of the U-shaped guard element 34 are disposed on opposite sides of the thumb engaging knob 33.

It will be seen that when the operator member 32 is shifted longitudinally forwardly, the actuator element 18 will be pivoted about its pivotal axis in a direction to actuate the shutter mechanism on the camera. Means are provided for normally urging the operator member in a rearward direction so that the actuator element 28 is urged out of engaging relation with the shutter mechanism of the camera C when the thumb-engaging knob 33 is disengaged by a user. This means includes a helical spring 35 which is positioned around the operator member 32 and which has its rear end bearing against a fixed collar 36 which is fixedly connected to the operator member 32 intermediate the ends thereof. The front end portion of the helical spring 35 engages a movable collar 37 which is disposed in co-axial relation with respect to the operator member 32 and is shiftable longitudinal relative thereto. The hollow interior 14 of the hand grip member 12 is reduced at its forwardmost end to define a shoulder 38 that is engaged by the movable collar 37 whereby upon forward translation of the operator member 32, the movable collar 37 cooperates with the fixed collar 36 to compress the spring so that the operator member 32 is constantly urged in a rear direction.

Attachment means are also provided for use with the support frame 11 to enable a user to very comfortably support, operate and aim the camera mounted upon the mounting device when a relatively large telephoto lens is used in conjunction with the movie camera. To this end, it will be seen that a pistol grip attachment 39 is provided and which includes a pistol grip handle 40 having a socket 41 in its upper end which receives one end of an elongate rod 42 therein. The inserted end of the rod 42 is secured in place in the socket 41 by any suitable securing means such as the set screw 43 as best seen in FIG. 2. The other end of the rod 42 is insertable into the socket 20a of the socket member 20 and is releasably retained in place by suitable securing elements such as the Allen head type set screw 44 which engages in a threaded recess in the socket member 20. A suitable Allen wrench 45 having a threaded knob 46 threadedly engages a threaded portion of a recess 47 in the lower end of the handle 40. It will therefore be seen that the pistol grip attachment 39 may be readily attached to and removed from the support frame 11.

Similarly, a shoulder engaging attachment 48 is also provided and includes a shoulder engaging member 49 having a curved rear surface and having a socket 51 formed adjacent the upper end thereof. This socket 51 receives the rear end of a curved rod 52 and is releasably secured thereto by set screw 53 which threadedly engages a threaded recess in the shoulder engaging member 49. The forward end portion of the rod 52 is receivable within the socket 21a of socket member 21 and is releasably retained therein by Allen head set screw 54 as best seen in FIG. 2.

Referring now to FIG. 4, it will be seen that a chest engaging attachment 55 is also provided which may be used in place of the shoulder engaging attachment 48. This chest engaging attachment includes a chest engaging member 56 which has a substantially flat exterior surface 57 and which is provided with a socket 58 at its upper end. The socket 58 releasably receives the rear end of the rod 59 therein, the forward end portion of the rod being insertable into the socket member 21 in the manner of the shoulder engaging attachment 48. It will be noted that the rod 59 and the rear surface of the chest engaging member 56 are angularly related to properly position a camera for accurate sighting by a user when chest engaging attachment is used. On the other hand, the curved construction of the rod 52 of the shoulder engaging attachment 48 permits a camera mounted on the support device to be properly positioned without necessitating bending of the head of the user when sighting or viewing through a view finder of the camera.

When the mounting device 10 is utilized in conjunction with a movie camera, the camera can be readily mounted upon the upper surface 19 of the camera support frame member 17. The coupling member 24 may be revolved into ready engagement with the threaded recess in the camera base and the stabilizing and positioning element 22 facilitates positioning of the camera and also tends to stabilize the same against rotation about an axis defined by the coupling member 24. The pistol grip attachment and the chest engaging attachment or shoulder engaging attachment are not required to be used in all circumstances and only the camera support frame 11 will be used in a number of instances. The contoured construction of the upper surface 13 of the hand grip member is such that the weight is distributed equally over all four fingers, the center of gravity being substantially located within the vertical transverse center line plane of the support frame 11. The opening defined by the frame is of a magnitude to very nicely accommodate the hand of most users even when gloves are used during cold weather. Thus the support frame 11 permits the user to very comfortably carry the camera when the latter is not being used.

When it is desirable to operate the camera, a user may quickly bring the camera into a comfortable operating position and may actuate the shutter mechanism thereof by pressing against the thumb engaging knob 33. This entire action of bringing the camera into position and depressing the thumb engaging knob 33 can be accomplished with one sweeping motion.

The camera support frame 11 also locates the center of gravity of a camera mounted thereon and is of a sufficient height whereby an operator may very effectively and stably support the mounting device and camera mounted thereon with one hand while using the other hand for rewinding or setting the camera.

In some instances, it is desirable to use the pistol grip attachment 39 and either the shoulder engaging or chest engaging attachment in conjunction with the support frame 11. These attachments may be readily secured into place by merely tightening the set screws associated with the front and rear socket members 20 and 21 respectively. To this end, it is pointed out that in order to facilitate accurate alignment for positioning of a handle 39 and the shoulder engaging or chest engaging element with respect to a user, the rods of the associated attachments may be provided with an indicia line which may be readily aligned with a corresponding indicia line on the socket members. It is also pointed out that a bipod may also be used in conjunction with the front socket member 20 when it is desirable to do so. With respect to the shoulder engaging attachment and the chest engaging attachment, these attachments may be used interchangeably to permit a user to comfortably support the camera mounted on the device to facilitate use of a view finder or reflex finder used in conjunction with the camera with either the right or left eye of the user.

The camera mounting device 10 including the detachable attachments is of such compact construction that the entire device may be carried in a conventional changing bag. Further the support frame in no way interferes with changing of the film of the camera when a camera is mounted on this support frame.

It will, therefore, be seen that I have provided a novel and improved camera mounting device which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What we claim is:

1. A camera mounting device comprising,
    a generally rectangular shaped support frame including an elongate hand grip member dimensioned and contoured to be gripped by the hand of a user, and normally horizontally oriented to extend in a fore and aft direction with respect to the user,
    spaced apart front and rear frame members respectively affixed to said hand grip member and projecting upwardly therefrom
    and a normally horizontally oriented elongate camera support frame member having a substantially flat upper surface for supporting a camera thereupon and being affixed to said front and rear frame members and spaced above said hand grip member,
    means on said camera support frame member for releasably engaging and retaining a camera mounted on said camera support frame member,
    a camera position and stabilizing element affixed to said camera support member and projecting upwardly from one longitudinal side thereof, and serving to engage and stabilize a camera mounted on said support frame member against revolving movement,
    an actuator element, means shiftably mounting said actuator element on said front frame member whereby said actuator element projects upwardly beyond said camera support member and being engageable with the shutter mechanism of the camera for actuating the same,
    and a thumb-engaging operator member shiftably mounted on said hand grip member and connected with said actuator element for shifting the same, and projecting rearwardly of said hand grip member whereby a user may support and operate a camera mounted on the support device with one hand.

2. The camera mounting device as defined in claim 1 and a forwardly opening socket member and a rearwardly opening socket member on said camera support frame member,
    an elongate pistol grip attachment having one end thereof releasably engaged by said forwardly opening socket member, and having a pistol grip handle at the other end thereof,
    and an elongate body engaging attachment having one end thereof releasably engaged by said rearwardly opening socket member and having body engaging member affixed to the other end thereof to be engaged by the chest or shoulder of a user.

3. The camera mounting device as defined in claim 1, wherein said hand grip member has an elongate opening extending longitudinally therethrough, and wherein said operator member extends through said opening.

4. The camera mounting device as defined in claim 1 wherein said front frame member has a vertical slot therein and wherein said actuator element is positioned within said slot and is pivotally mounted on said front frame member.

5. The camera mounting device as defined in claim 3 wherein said operator member is of elongate rigid construction and is longitudinal movable between operative and inoperative positions, and a resilient yieldable means in said opening in the hand grip member engaging the operator member and yieldably resisting movement of the operator member toward said operative position.

6. The camera mounting device as defined in claim 4 wherein actuator element is of elongate rigid construction and is pivotally mounted intermediate its ends on said front frame member.

References Cited

UNITED STATES PATENTS

| 2,140,051 | 12/1938 | Hart | 95—86 |
| 2,483,711 | 10/1949 | Roos | 95—86 |
| 3,105,430 | 10/1963 | Fernelius | 95—86 |
| 2,358,777 | 9/1944 | Rappleyea | 95—12.5 |

OTHER REFERENCES 666,808  2/1952  Great Britain.

JOHN M. HORAN, *Primary Examiner.*